No. 872,393. PATENTED DEC. 3, 1907.
H. E. VOTAW.
FORM FOR CEMENT CISTERNS OR THE LIKE.
APPLICATION FILED SEPT. 26, 1906.

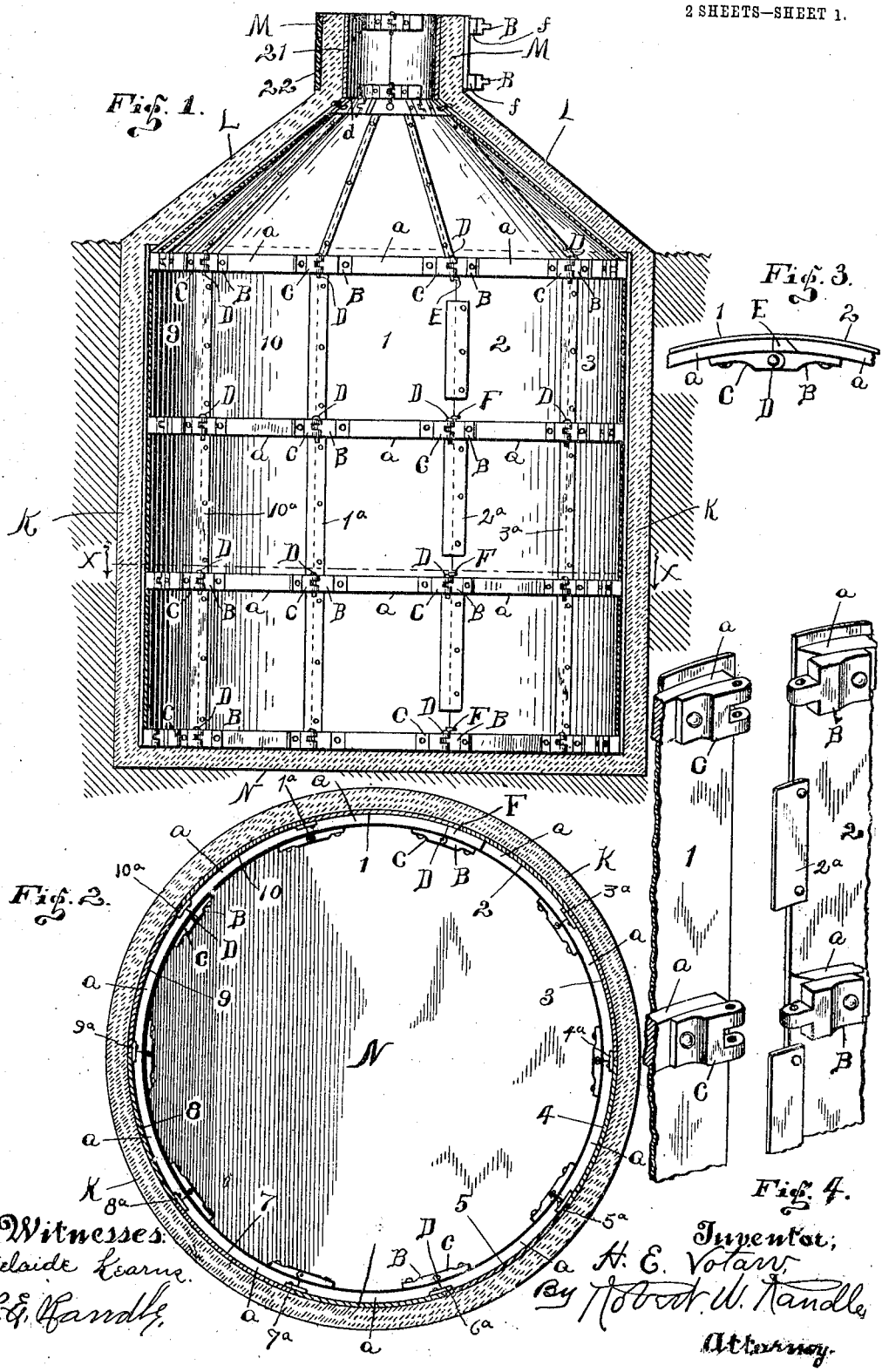

2 SHEETS—SHEET 2.

Witnesses:
Adelaide Kearns
R. E. Randle

Inventor;
H. E. Votaw,
By Robert W. Randle
Attorney.

UNITED STATES PATENT OFFICE.

HOWARD E. VOTAW, OF COLLEGE CORNER, INDIANA.

FORM FOR CEMENT CISTERNS OR THE LIKE.

No. 872,393.  Specification of Letters Patent.  Patented Dec. 3, 1907.

Application filed September 26, 1906. Serial No. 336,240.

*To all whom it may concern:*

Be it known that I, HOWARD E. VOTAW, a citizen of the United States, residing at College Corner, in the county of Jay and State of Indiana, have invented a new and useful Construction for Forms for Cement Cisterns or the Like; and I hereby declare the following to be a full and explicit exposition and specification thereof, being such as will enable others to make and use the same with absolute exactitude.

My invention consists of a former for molding cement cisterns or the like, the same being composed of a plurality of detachable sections assembled vertically in circular form, a plurality of crown forming sections, and also the neck forming sections, with detachable means for each, and with interlocking and self sustaining means for the several parts, all substantially as will hereinafter be particularly specified and set forth.

The object of my invention, broadly speaking, is to provide a cistern former which may be composed of a minimum number of mechanical parts; which will be easy to handle, to facilitate the assembling and disassembling of the parts; to provide a construction which can be manufactured and sold at a comparatively low price; and by which a cement cistern may be formed which will be practically perfect in its several proportions.

A more particular object is to provide a cement cistern forming device in which, when assembled, all the parts thereof will contribute to providing a self-supporting and interlocking unit whose resistance will be above its requirements, and which may be easily disassembled and removed from the cistern after the cement material has solidified.

Other particular objects and advantages will be made manifest in the course of the ensuing specification. The construction of my invention is clearly visualized in the accompanying two sheets of drawings, in which—

Figure 5:
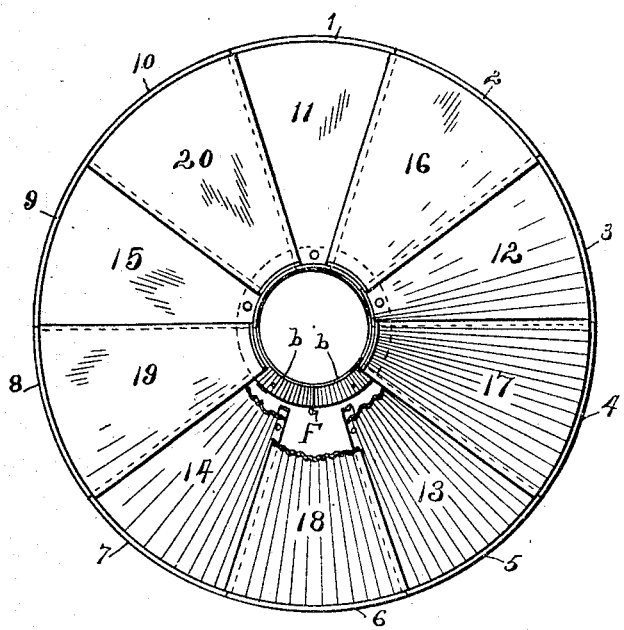
Figure 6:
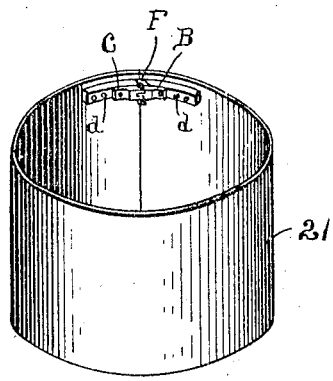
Figure 9:
Figure 10:
Figure 7:
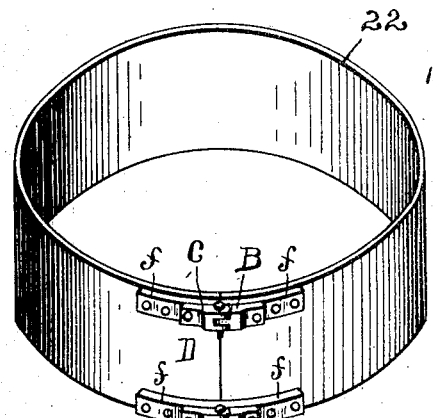
Figure 8:
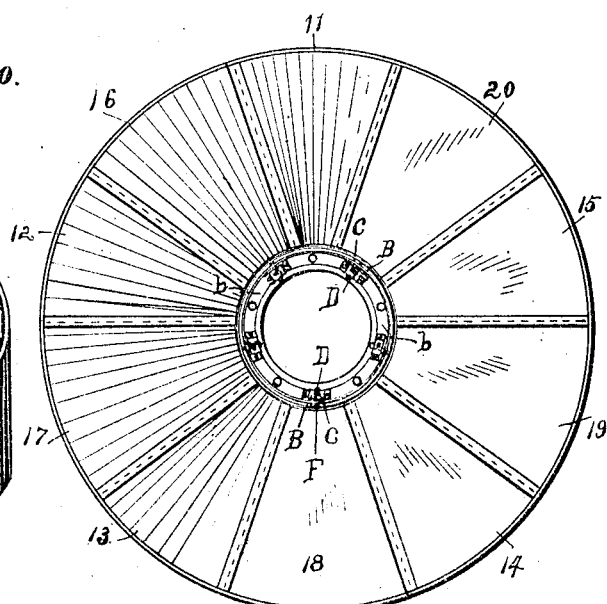
Figure 11:
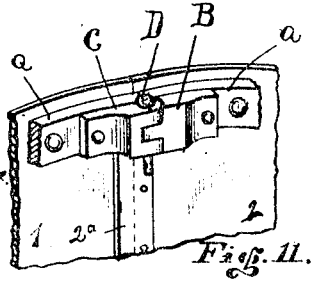

Figure 1 is a vertical central sectional view of my invention; Fig. 2 is a cross sectional view of the invention, as taken on the line X—X of Fig. 1; Fig. 3 is a detail plan view of one of the knuckle joints especially constructed to facilitate the starting or disassembling of the sections; Fig. 4 is a perspective view of the meeting edges of a portion of two sections which two sections are especially constructed to facilitate their removal when starting to disassemble the sections; Fig. 5 is a top plan view of the crown; Fig. 6 is a perspective view of the inner neck member; Fig. 7 is a perspective view of the outer neck member; Fig. 8 is a plan view of the underside of the crown; Figs. 9 and 10 are detail views of two of the retaining keys; and Fig. 11 is a perspective detail view of one of the knuckle joints which I employ.

Similar indices denote and refer to like parts throughout the several views of the drawings.

In order that the construction and operation of my invention may be more fully understood and appreciated I will now take up the detail description thereof in which I will set forth the invention as briefly and as compactly as I may.

In its construction the device is composed of a plurality of vertical sections, indicated by the numerals 1, 2, 3, 4, 5, 6, 7, 8, 9 and 10, each consisting of a single length of sheet metal bent longitudinally to conform to the curvature of the cistern to be formed, their lengths being equal to the depth of the cistern to be formed. Each of said sections is identical with every other in construction, except sections 1 and 2 which will presently be described as to their differentiations. Disposed across the concave face of each of said sections are a plurality (preferably four) ribs the same being designated by the letter $a$ in each instance. Said ribs are adapted to abut together when the device is set up as shown in Figs. 1 and 2. Each two abutting ends of the ribs are adapted to be coupled together by a knuckle-joint or hinge, as shown in Fig. 11, the male member of each hinge being in each instance denoted by the letter B, and the female member being denoted by the letter C. Said members B and C are secured to the faces of the inner ends of the ribs and being oppositely disposed substantially as shown. Each pair of the members B and C are adapted to be coupled together by a pin, to be loosely insertible, and each of said pins is designated by the letter D.

In the formation of cement cisterns I first form a hole in the earth of sufficient depth for a cistern, and of a circular diameter greater than is the diameter of the assembled device. I then set up the sections within said hole, as indicated in Fig. 1 and 2, locking the sections together, as in Fig. 11, thereby forming a round device of somewhat less dimensions than is the said hole in which they are located. After the above the space between the device and the earth may be filled in with plastic cement and this is then allowed to solidify.

In order to provide for the removal of the device after the cement has hardened it is necessary to construct the adjacent portions of two of the sections slightly different from the others just described: This latter construction is shown most clearly in Figs. 3 and 4, in which the left-hand ends of the ribs $a$ of the section 2 are cut on an angle both vertically and horizontally. The horizontal angles of each extend from the edge of the section 2 inward and to the right of the shoulders of the members B, and the vertical angles of the upper ribs $a$, of the section 2, extend from its upper edge downward and to the right, while all the others therebelow are cut from their upper edges downward and to the left, for the reason which will presently be made apparent. In reference to number 1 the ribs $a$ thereof do not extend out to the edge of that number, as indicated in Fig. 4, thereby forming a space between each of the oppositely disposed ends of the ribs, which spaces are to be filled in by keys or wedges after the sections 1 and 2 are brought together and locked by one of said pins D as shown. The upper key E is inserted from below and is to be driven upward, while each of the other keys, F, is inserted from above and is to be driven down. By reason of the above it will be apparent that after the cement has solidified around the device the keys E and F may be removed, and that by removing the pins D the left-hand edge of the section 2 may be drawn inward and removed, after which each of the other sections may be easily removed and taken from the cistern to again be set up in the manner shown and described. The heads or lugs extending out from the larger end of the keys are to provide means for facilitating the removal of the keys by a pry or the like. Before the removal of said sections however, means are provided for forming the top and neck of the cistern, which will now be described: The crown on which the top of the cistern is to be formed is composed first of a plurality of separated triangular sections 11, 12, 13, 14 and 15, their curved bases being adapted to rest on the upper row of ribs $a$, from where they extend inwardly and upwardly at a predetermined angle, leaving a circular aperture between their inner ends as shown. Near their upper inner ends each of said sections is secured to a separate rib $b$, which ribs project out on each side of their respective sections sufficiently for the ends of the ribs to abut each other when the sections are located at the desired position and inclination, as shown in Fig. 1. The adjoining ends of each two of said ribs $b$ are connected by a knuckle joint, as shown in Fig. 11, except that these are formed curved, and at one point where the arrangement is the same as shown in Fig. 4, at which a key, similar to the key F, is employed to allow the sections to be removed. The space between each two of the sections 11, 12, 13, 14 and 15 may be covered by the overlapping auxiliary sections 16, 17, 18, 19 and 20. When assembled as above set forth and as shown in Figs. 5 and 6 it is apparent that by reason of the knuckle joints formed by the members B and C of the ribs $b$ the crown will be self supporting and will be able in addition thereto to support a layer of plastic cement thereon which may be deposited over the top of the crown to form the cistern top. After the cement forming the top has solidified then the key F may be removed, thereby making it possible to disconnect the top in the manner described with reference to the side sections, but before this is done the neck of the cistern should be formed.

Before the cement forming the top has been deposited on the crown the inner neckband 21 should be positioned around the central aperture of the crown, allowing it to rest thereon as shown in Fig. 1. This band 21 is simply a single length of sheet metal having secured on the inside face thereof and extending a short distance from its meeting edges the short ribs $d$, shown in Figs. 1 and 6, secured on the ends of which are the two sets of members B—C and B—C, and each pair of ribs $d$ are spaced apart by a key F as shown in Fig. 6, and the construction and operation of these joints of the band 21 are the same as that as shown in Fig. 4. After the cement forming the top has been deposited on the crown, and extends up against the band 21, then the outer neck-band 22 is rested on the top as shown. This band 22 is of greater diameter than the band 21, around which it is disposed, and it is of less height the difference in height being the same as the thickness of the cement top. This outer band is also formed of a single length of sheet metal, having secured on the outside face thereof and extending a short distance from its meeting edges the ribs $f$, as shown in Fig. 7. Secured on the ends of the ribs $f$ are the two sets of knuckle joints, each formed by members B—C, connected by the pin D, the construction of these joints of the band 22 is the same as that shown in Fig. 11, except that they are formed for an oppositely disposed curvature as shown in Fig. 7.

When constructed as described the cistern will be composed of an integral unit, comprising the vertical wall K, the top L, the neck M, and the bottom N, the latter being formed either before or after the formation of the other parts.

Particularly when the sheet-metal of the sections is comparatively thin I have found it advisable to employ reinforcing strips as the strips $1^a$, $2^a$, $3^a$, $4^a$, $5^a$, $6^a$, $7^a$, $8^a$, $9^a$, and $10^a$, which are secured along the left-hand vertical edge of the respective sections, 1, 2, 3, 4, 5, 6, 7, 8, 9 and 10, as indicated, which when the sections are assembled will lap over the edge of the adjoining sections; and if desired the adjoining edges of the crown sections and the adjoining edges of the bands 21 and 22 may be reinforced in like manner, all substantially as shown in the drawings.

Having now fully shown and described my invention in its preferred embodiment, what I claim and desire to secure by Letters Patent of the United States, is—

A form for making cement cisterns or the like, comprising a plurality of sections each formed substantially on the segment of a circle, said sections having ribs secured transversely to their inner faces and provided with means for flexibly connecting their adjacent ends, the adjacent ends of the ribs of a pair of said sections being spaced apart, knuckle joint members secured to the inner sides of these ribs and projecting beyond but in rear of their spaced ends, pins connecting said knuckle joint members, seats thus being formed between the spaced rib ends and between the knuckle joint members and the inner sides of the form sections, and longitudinally tapering wedges adapted to be driven into said seats to expand the form.

In testimony whereof I have hereunto signed my name to this specification in the presence of two subscribing witnesses.

HOWARD E. VOTAW.

Witnesses:
P. M. HEARN,
JOHN M. SHULTZ.